US010585190B2

(12) United States Patent
Smith et al.

(10) Patent No.: US 10,585,190 B2
(45) Date of Patent: Mar. 10, 2020

(54) DEVICES AND METHODS FOR LOCATING AND VISUALIZING UNDERWATER OBJECTS

(71) Applicant: NAVICO HOLDING AS, Egersund (NO)

(72) Inventors: Michael Smith, Toronto (CA); Jung Wook Yeum, Mississauga (CA)

(73) Assignee: NAVICO HOLDING AS, Egersund (NO)

( * ) Notice: Subject to any disclaimer, the term of this patent is extended or adjusted under 35 U.S.C. 154(b) by 0 days.

(21) Appl. No.: 16/048,755

(22) Filed: Jul. 30, 2018

(65) Prior Publication Data
US 2018/0329056 A1    Nov. 15, 2018

Related U.S. Application Data

(63) Continuation of application No. 15/700,918, filed on Sep. 11, 2017, now abandoned, which is a
(Continued)

(51) Int. Cl.
*G01S 15/04* (2006.01)
*G01S 15/96* (2006.01)
(Continued)

(52) U.S. Cl.
CPC .............. *G01S 15/04* (2013.01); *G01S 7/521* (2013.01); *G01S 7/6218* (2013.01);
(Continued)

(58) Field of Classification Search
CPC .................... G06F 11/3684; G06F 3/04842
(Continued)

(56) References Cited

U.S. PATENT DOCUMENTS 3,341,697 A    9/1967  Norman et al.
3,610,798 A   10/1971  Murphree
(Continued)

FOREIGN PATENT DOCUMENTS

DE    29617813 U1    11/1996
EP     2602639 A1     6/2013
(Continued)

OTHER PUBLICATIONS

International Search Report and Written Opinion of International Application No. PCT/CA2016/050729 dated Aug. 26, 2016.
(Continued)

*Primary Examiner* — Ojiako K Nwugo
(74) *Attorney, Agent, or Firm* — Nelson Mullins Riley & Scarborough LLP

(57) ABSTRACT

Sonar devices for detecting underwater objects are provided whereby a set of angled ultrasound transducers are employed to sense ultrasound signals from a plurality of different spatial regions. The angled ultrasound transducers may include a first pair of side-viewing ultrasound transducers and a second pair of ultrasound transducers configured for interrogating forward and reverse directions. The ultrasound signals from the set of angled ultrasound transducers may be processed to identify the presence of underwater objects in each spatial region, and the resulting identified underwater objects may be displayed, on a per-region basis, on a user interface. The ultrasound signals may additionally or alternatively be processed to generate a topographical model of the bed surface, and to generate a topographical surface image based on the three-dimensional topographical model. The topographical surface image may be displayed as a fly-over animation.

19 Claims, 9 Drawing Sheets

Related U.S. Application Data continuation of application No. 15/189,650, filed on Jun. 22, 2016, now Pat. No. 9,759,813.

(60) Provisional application No. 62/182,989, filed on Jun. 22, 2015.

(51) Int. Cl.

| *G01S 7/521* | (2006.01) |
| *G01S 7/62* | (2006.01) |
| *G01S 15/87* | (2006.01) |
| *G01S 15/89* | (2006.01) |
| G01S 7/52 | (2006.01) |
| G01S 15/86 | (2020.01) |

(52) U.S. Cl.
CPC .......... *G01S 7/6263* (2013.01); *G01S 7/6272* (2013.01); *G01S 7/6281* (2013.01); *G01S 15/87* (2013.01); *G01S 15/89* (2013.01); *G01S 15/96* (2013.01); G01S 7/52003 (2013.01); G01S 15/86 (2020.01); G01S 15/8902 (2013.01)

(58) Field of Classification Search
USPC ........................................................ 340/541
See application file for complete search history.

(56) References Cited

U.S. PATENT DOCUMENTS

| | | | |
|---|---|---|---|
| 3,713,081 A | 1/1973 | Murphree | |
| 3,781,775 A * | 12/1973 | Malloy | G01S 15/8902 367/104 |
| 3,829,596 A | 8/1974 | Murphree | |
| 3,835,234 A | 9/1974 | Murphree | |
| 3,918,054 A | 11/1975 | Collins | |
| 4,179,681 A | 12/1979 | Zehner et al. | |
| 4,214,269 A | 7/1980 | Parker et al. | |
| 4,216,537 A | 8/1980 | Delignieres | |
| 4,271,707 A | 6/1981 | Lakin | |
| 4,387,365 A | 6/1983 | Berry et al. | |
| 4,510,709 A | 4/1985 | Melcher | |
| 4,597,069 A | 6/1986 | Milano et al. | |
| 4,644,512 A | 2/1987 | Grilk | |
| 4,777,489 A | 10/1988 | Allan | |
| 4,879,697 A | 11/1989 | Lowrance et al. | |
| 4,908,800 A | 3/1990 | DiLemmo | |
| 4,926,399 A | 5/1990 | Hickman | |
| 4,943,951 A | 7/1990 | Leavell et al. | |
| 4,986,755 A | 1/1991 | Johnson | |
| 5,005,419 A | 4/1991 | O'Donnell et al. | |
| 5,064,376 A | 11/1991 | DeCrescent | |
| 5,068,665 A | 11/1991 | Piazza et al. | |
| 5,107,841 A | 4/1992 | Sturgill | |
| 5,122,989 A | 6/1992 | Pirie et al. | |
| 5,142,497 A * | 8/1992 | Warrow | G01S 7/521 367/12 |
| 5,173,947 A | 12/1992 | Chande et al. | |
| 5,181,026 A | 1/1993 | Granville | |
| 5,184,330 A | 2/1993 | Adams et al. | |
| 5,200,931 A | 4/1993 | Kosalos et al. | |
| 5,463,597 A | 10/1995 | Harlev | |
| 5,493,539 A * | 2/1996 | Haley | G01S 7/539 367/131 |
| 5,483,767 A | 7/1996 | Langer | |
| 5,537,380 A | 7/1996 | Sprankle et al. | |
| 5,598,206 A | 1/1997 | Bullis | |
| 5,808,967 A * | 9/1998 | Yu | B06B 1/0629 367/138 |
| 5,838,635 A | 11/1998 | Masreliez | |
| 6,222,449 B1 | 4/2001 | Twining | |
| 6,255,800 B1 | 7/2001 | Bork | |
| 6,273,771 B1 | 8/2001 | Buckley et al. | |
| 6,345,179 B1 | 2/2002 | Wiegers et al. | |
| 6,380,890 B1 | 4/2002 | Smith et al. | |
| 6,508,192 B2 | 1/2003 | Lentine | |
| 6,520,105 B2 | 2/2003 | Koda et al. | |
| 6,581,025 B2 | 6/2003 | Lehman | |
| 6,667,934 B1 | 12/2003 | Healey | |
| 6,693,847 B2 | 2/2004 | Betts | |
| 6,724,688 B2 | 4/2004 | Betts et al. | |
| 6,735,450 B1 | 5/2004 | Remmert | |
| 6,771,562 B2 | 8/2004 | Betts et al. | |
| 6,909,946 B1 | 6/2005 | Kabel et al. | |
| 7,534,152 B1 * | 5/2009 | Lloyd | B63B 22/06 441/2 |
| 7,538,511 B2 | 5/2009 | Samek | |
| 8,300,499 B2 | 10/2012 | Coleman et al. | |
| 8,305,840 B2 | 11/2012 | Maguire | |
| 8,645,012 B2 | 2/2014 | Salmon et al. | |
| 8,761,976 B2 | 6/2014 | Salmon et al. | |
| 8,934,318 B2 | 1/2015 | Lebedev et al. | |
| 9,360,553 B2 | 6/2016 | Lebedev et al. | |
| 9,383,444 B2 | 7/2016 | Lebedev et al. | |
| 9,408,378 B2 | 8/2016 | Senanko | |
| 9,488,728 B2 | 11/2016 | Baumann et al. | |
| 9,628,592 B2 | 4/2017 | Wu | |
| 10,284,804 B2 | 5/2019 | Marshall et al. | |
| 2002/0071345 A1 | 6/2002 | Chiang et al. | |
| 2003/0012648 A1 | 1/2003 | De Facci Oliveira et al. | |
| 2003/0078706 A1 | 4/2003 | Larsen | |
| 2003/0236461 A1 | 12/2003 | Poland | |
| 2004/0179332 A1 | 9/2004 | Smith et al. | |
| 2005/0084033 A1 | 4/2005 | Rosen et al. | |
| 2005/0088643 A1 | 4/2005 | Anderson | |
| 2005/0135192 A1 | 6/2005 | Fairbairn | |
| 2005/0259515 A1 | 11/2005 | Maesawa | |
| 2006/0023570 A1 | 2/2006 | Betts et al. | |
| 2007/0147173 A1 | 6/2007 | Park | |
| 2008/0013404 A1 | 1/2008 | Acker et al. | |
| 2008/0112265 A1 * | 5/2008 | Urbano | G01S 7/52096 367/87 |
| 2009/0037040 A1 | 2/2009 | Salmon et al. | |
| 2009/0122647 A1 | 5/2009 | Betts et al. | |
| 2009/0240354 A1 | 9/2009 | Davidson | |
| 2010/0045448 A1 * | 2/2010 | Kakinami | B60R 1/00 340/435 |
| 2011/0004600 A1 | 1/2011 | Walker et al. | |
| 2012/0020185 A1 * | 1/2012 | Welker | G01V 1/38 367/16 |
| 2012/0289103 A1 * | 11/2012 | Hudson | F42B 19/00 440/38 |
| 2013/0148471 A1 | 6/2013 | Brown et al. | |
| 2013/0272093 A1 | 10/2013 | Chen et al. | |
| 2014/0010043 A1 | 1/2014 | Pawlik et al. | |
| 2014/0022864 A1 | 1/2014 | Lebedev et al. | |
| 2014/0057677 A1 * | 2/2014 | Liubinas | G01S 15/96 455/556.1 |
| 2014/0066125 A1 | 3/2014 | Wu | |
| 2014/0254324 A1 | 9/2014 | Dubberley et al. | |
| 2014/0269164 A1 | 9/2014 | Betts et al. | |
| 2015/0078123 A1 * | 3/2015 | Batcheller | G01S 17/89 367/7 |
| 2015/0078134 A1 * | 3/2015 | Yu | G01S 7/6227 367/107 |
| 2015/0100658 A1 | 4/2015 | Lieberman et al. | |
| 2015/0369908 A1 * | 12/2015 | Zimmerman | G01S 15/96 367/7 |
| 2016/0119541 A1 | 4/2016 | Alvarado-Moya | |
| 2016/0259053 A1 * | 9/2016 | Proctor | G01S 15/8902 |
| 2016/0341827 A1 | 11/2016 | Horner et al. | |
| 2016/0377716 A1 | 12/2016 | Proctor et al. | |
| 2017/0038460 A1 | 2/2017 | Clark et al. | |
| 2017/0082739 A1 | 3/2017 | Horner et al. | |
| 2017/0199275 A1 | 7/2017 | Wu | |
| 2017/0213459 A1 | 7/2017 | Ogaz | |

(56) References Cited

U.S. PATENT DOCUMENTS

2018/0228454 A1 8/2018 Butani et al.
2019/0346567 A1 11/2019 Laster

FOREIGN PATENT DOCUMENTS

| JP | H11023708 A | 1/1999 |
|---|---|---|
| KR | 100923668 B1 | 10/2009 |
| KR | 100993227 B1 | 11/2010 |
| WO | WO 2001/53148 A1 | 7/2001 |
| WO | WO 2010/120896 A1 | 10/2010 |
| WO | WO 2011/008430 | 1/2011 |
| WO | WO 2013/108088 A1 | 7/2013 |
| WO | WO 2014/019019 A1 | 2/2014 |
| WO | WO 2016/205938 A1 | 12/2016 |

OTHER PUBLICATIONS

Global FlyFisher; "Humminbird Smartcast 35" retrieved <http://globalflyfisher.com/humminbird-smartcast-38> Published Mar. 3, 2009.

Lucky; Dot Matrix Wireless Fishfinder FFW718; retrieved from https://amazon.co.uk/gp/product/B004HGJJ28/?tag=awp7-21, Feb. 15, 2018. Date Unknown.

Alibaba, Sonar Wireless Fish Finder, Retrieved from <https://www.alibaba.com/showroom/sonar-wireless-fish-finder.html> on Feb. 15, 2018. Date Unknown.

ReelSonar, The iBobber wireless sonar fish finder fishing tool. Retrieve Feb. 16, 2018 from <https://reelsonar.com/>. Date Unknown.

Smartcast RF15 Humminbird; http://www.smartcast-rf30.com/smartcast_rf10.htm ; retrieved Aug. 1, 2016; 2 pages.

\* cited by examiner

DEVICES AND METHODS FOR LOCATING AND VISUALIZING UNDERWATER OBJECTS

CROSS-REFERENCE TO RELATED APPLICATIONS

This application is a continuation of and claims priority to U.S. application Ser. No. 15/700,918, titled "DEVICES AND METHODS FOR LOCATING AND VISUALIZING UNDERWATER OBJECTS" and filed Sep. 11, 2017, which is a continuation of and claims priority to U.S. application Ser. No. 15/189,650, titled "DEVICES AND METHODS FOR LOCATING AND VISUALIZING UNDERWATER OBJECTS" and filed Jun. 22, 2016, now issued as U.S. Pat. No. 9,759,813, which claims priority to U.S. Provisional Application No. 62/182,989, titled "DEVICES AND METHODS FOR LOCATING AND VISUALIZING UNDERWATER OBJECTS" and filed Jun. 22, 2015, the entire contents of each being incorporated herein by reference in their entireties.

BACKGROUND

The present disclosure relates to sonar device and methods detection of underwater objects.

Fish finding sonar devices typically employ a single, dual-frequency transducer for sonar detection, where the higher frequency is used for clarity in shallower waters, and the lower frequency is employed to achieve penetration in deeper waters. The lower frequency casts a powerful, wide beam that can more easily detect underwater objects at or near the bottom of a body of water, however, with the beam being relatively wide, the increased depth penetration comes at the expense of lateral spatial resolution. The higher frequency beam, although being incapable of deep penetration, provides a much narrower beam to better detect structural changes and suspended fish. A user may switch between the two frequencies depending on the environment they are in. A common frequency pairing for a low-cost fish finder is 50/200 kHz, where the 50 kHz signal would have a relatively wide angle (40+ degrees) capable of deep penetration with the higher 200 kHz signal having a much narrower beam (~20 degrees) that is only effective in shallower waters.

SUMMARY

Sonar devices for detecting underwater objects are provided whereby a set of angled ultrasound transducers are employed to sense ultrasound signals from a plurality of different spatial regions. The angled ultrasound transducers may include a first pair of side-viewing ultrasound transducers and a second pair of ultrasound transducers configured for interrogating forward and reverse directions. The ultrasound signals from the set of angled ultrasound transducers may be processed to identify the presence of underwater objects in each spatial region, and the resulting identified underwater objects may be displayed, on a per-region basis, on a user interface. The ultrasound signals may additionally or alternatively be processed to generate a topographical model of the bed surface, and to generate a topographical surface image based on the three-dimensional topographical model. The topographical surface image may be displayed as a fly-over animation.

Accordingly, in a first aspect, there is provided a sonar device for detecting underwater objects, the sonar device comprising:
a housing;
a plurality of angled ultrasound transducers supported by said housing;
processing circuitry provided within said housing, said processing circuitry comprising an ultrasound transceiver that is operably connected to said angled ultrasound transducers, said processing circuitry further comprising an interface for communicating with a remote computing device, and wherein said processing circuitry is connected or connectable to a power source;
wherein at least two of said ultrasound transducers are angled ultrasound transducers having respective ultrasound beam axes that are directed at an acute angle relative to a primary axis of said sonar device, such that each angled transducer is configured to interrogate a different spatial region; and
wherein said sonar device is configured to float in a stable orientation such that said primary axis is vertically oriented in still water.

In another aspect, there is provided a system for detecting and locating underwater objects, the system comprising:
a remote computing device; and
a sonar device configured as described above;
wherein one of said remote computing device and said sonar device is configured to:
obtain signals from the angled ultrasound transducers, wherein the signals are received in response to ultrasound beams emitted from the angled transducers; and
process the signals to identify, within each spatial region, the presence of one or more underwater objects; and
wherein said remote computing device is configured to display, on a user interface, a visual representation indicating, on a per-region basis, the presence of the underwater objects detected within each the spatial region.

In another aspect, there is provided a computer-implemented method of generating and presenting sonar data, the method comprising:
receiving, on the remote computing device, sonar data transmitted from a sonar device configured according to claim 1, the sonar data comprising signals obtained from the angled ultrasound transducers, the signals having been obtained in response to ultrasound beams emitted from the angled ultrasound transducers;
processing the signals to identify, within each spatial region, the presence of one or more underwater objects;
displaying, on a user interface associated with remote computing device, a visual representation indicating, on a per-region basis, the presence of the underwater objects detected within each the spatial region.

In another aspect, there is provided a system for measuring and displaying a visualization of a bed surface of a body of water, the system comprising:
a remote computing device; and
a sonar device configured as described above;
wherein said sonar device is configured to obtain signals from a pair of angled ultrasound transducers and from said central ultrasound transducer, wherein the signals are received in response to ultrasound beams emitted by the ultrasound transducers; and
wherein one of said remote computing device and said sonar device is configured to:
process the signal from the central ultrasound transducer to determine, a central bed depth measure providing an estimate of bed depth within the central region; and process the signals from the pair of angled ultrasound transducers to determine lateral bed depth measures, each lateral bed depth measure providing an estimate of bed depth within a respective lateral region; and wherein said remote computing device is configured to:

process the central bed depth measures and the lateral bed depth measures associated with a plurality of locations in a longitudinal direction to generate a three-dimensional topographical model of the bed surface; and render a topographical surface image based on the three-dimensional topographical model and displaying the topographical surface image on a user interface.

In another aspect, there is provided a computer-implemented method of measuring and displaying a visualization of a bed surface of a body of water, the method comprising:

receiving, on the remote computing device, signals a sonar device configured as described above, the signals having been obtained from a pair of angled ultrasound transducers and from a central ultrasound transducer at a plurality of locations in a longitudinal direction, wherein the signals are received in response to ultrasound beams emitted by the ultrasound transducers; and processing the signal from the central ultrasound transducer to determine, at each location, a central bed depth measure providing an estimate of bed depth within the central region; and processing the signals from the pair of angled ultrasound transducers to determine, at each longitudinal location, lateral bed depth measures, each lateral bed depth measure providing an estimate of bed depth within a respective lateral region;

processing the central bed depth measures and the lateral bed depth measures associated with the locations to generate a three-dimensional topographical model of the bed surface; and rendering a topographical surface image based on the three-dimensional topographical model and displaying the topographical surface image on a user interface.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

Figure 1:
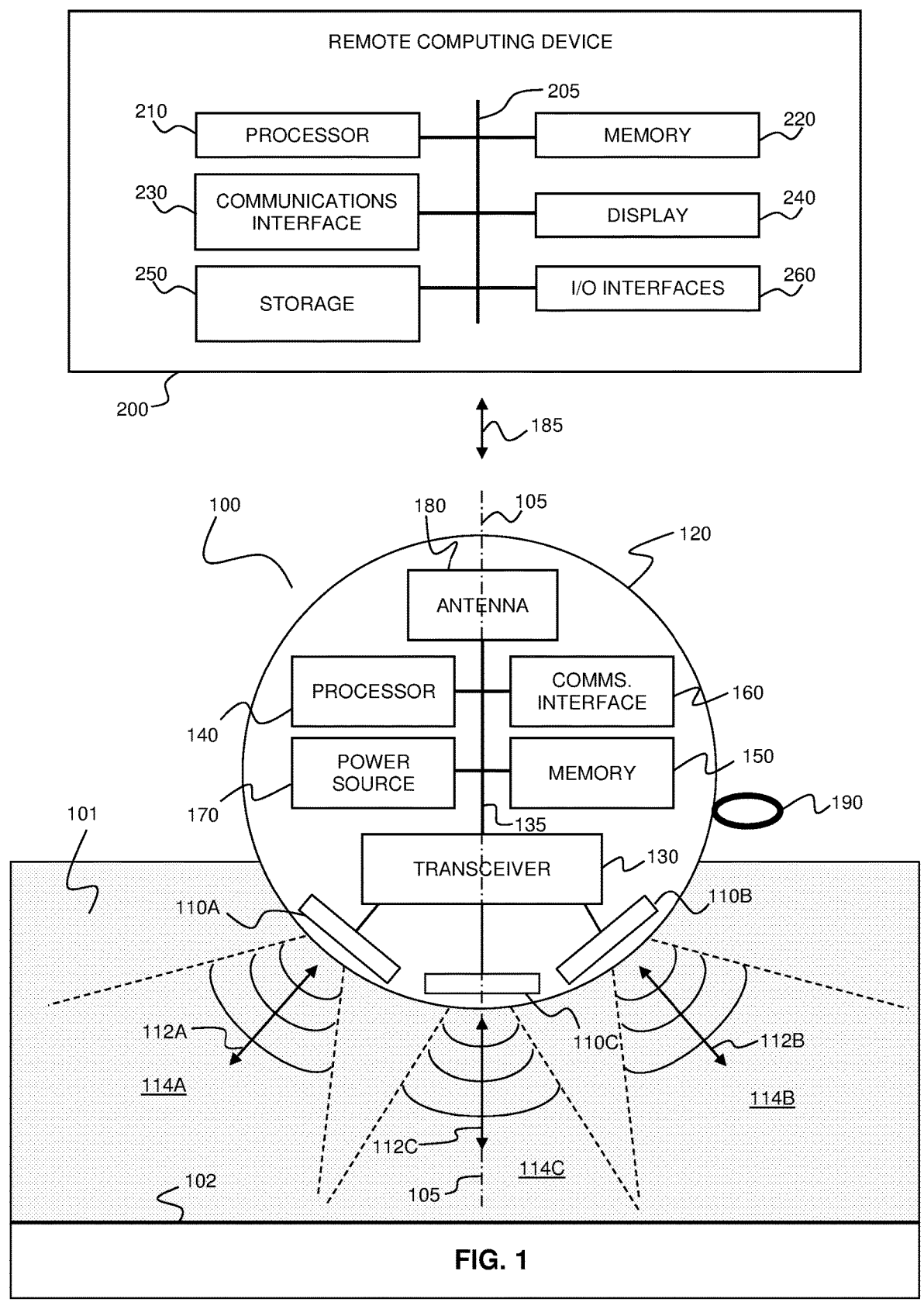
FIG. 1 shows an example system for identifying underwater objects with a sonar device.

In one example embodiment, a sonar device is provided for locating the presence of underwater objects, such as one or more fish, in a plurality of spatial regions. FIG. 1 shows an example implementation of a system including a sonar device 100 for use in locating the presence of underwater objects. Sonar device 100 includes ultrasound transducers 110A-110C secured in a housing 120, where the ultrasound transducers 110A-110C are supported and oriented such that their respective ultrasound beam axes 112A-112C are directed in different directions for interrogating different spatial regions 114A-114C. Each ultrasound transducer is connected to an ultrasound transceiver 130, which provides excitation pulses to the ultrasound transducers, and receives ultrasound signals responsively generated by reflections from underwater objects.

Housing 120 contains and protects internal electronics and processing circuitry. The shape of the housing 120 need not be spherical as shown in FIG. 1. The housing 120 may be waterproof and constructed of plastic or another buoyant material. It will be understood that there are numerous sizes, shapes, and materials that could be utilized for the housing in the embodiments of the present disclosure. The housing 120 can generally take on a variety of shapes, provided that it floats in a stable and pre-configured orientation.

The sonar device 100 is configured, by selection of the housing shape, and the weight distribution of the housing and its supported components, such that it floats in a stable and pre-selected configuration. The sonar device 100 is shown in FIG. 1 as floating in still water 101, whereby a primary axis 105 associated with the sonar device 100 is oriented in the vertical orientation. The primary axis 105 of the sonar device tilts relative to the vertical direction when the sonar device is perturbed.

The example embodiment illustrated in FIG. 1 shows the transceiver 130 connected, through bus or electrical path 135, to processing circuitry that includes processor 140 and memory 150, and to communications interface 160 and power source 170. Transceiver 130 controls ultrasound transducers 110A-110C to emit excitation ultrasound energy therefrom along respective ultrasound beam axes 112A-112C, and transceiver 130 receives signals from the ultrasound transducers 110A-110C in response to ultrasound waves reflected by underwater objects. In one example implementation, transceiver 130 receives raw sonar electrical signals from ultrasound transducers 110A-110C.

Processor 140 is configured, based on executable instructions stored in memory 150, to control the transmission of sonar data, via communications interface 160, to the remote computing device 200. The sonar data that is transmitted to the remote computing device 200 may be raw sonar data (e.g. digitized raw data suitable for transmission over a wireless communication channel) or data that is pre-processed by the processor 140. For example, processor 140 may be programmed to identify the presence, and optionally depth, associated with one or more objects in each spatial region 114A-114C. Alternatively, such processing may be performed remotely by remote computing device 200, as described further below.

As shown in FIG. 1, communications interface 160 may be wireless interfacing device, which employs antenna 180 to transmit and optionally receive wireless signals 185. For example, communications interface 160 may include a wireless network transceivers (e.g., Wi-Fi™, Bluetooth®, cellular), wired network interfaces (e.g., a CAT-type interface), USB, FireWire, or other known interfaces. A wireless housing may be direct (directly between the sonar device 100 and the remote computing device 200) or indirectly (e.g. where each device remotely connects to a remote server through a cellular network). A wired connection may be facilitated thought a suitable water-tight connector that is externally accessible on the housing.

As shown in FIG. 1, sonar device 100 includes, or is connectable to, a power supply 170. A rechargeable or non-rechargeable battery may be used to provide power. The power may also be provided by an external power source, such as an AC adapter or a powered docking cradle that supplements and/or recharges a battery. Alternatively, power may be provided through a solar cell device, such as a photovoltaic array.

Referring again to FIG. 1, ultrasound transducers 110A-110C may be formed from a wide range of piezoelectric materials. For example, the ultrasound transducers 110A-110C may be formed from ceramic piezoelectric materials. In some example embodiments, the ultrasound transducers 110A-110C may be operable at one or more frequencies. For example, one or more of ultrasound transducers 110A-110C are operated at dual frequencies, in order to produce respective ultrasound beams that have different angular bandwidths and different penetration depths within the water. In one example implementation, the sonar device 100 may be configured such that the ultrasound transducers 110A-110C are operated at a first frequency of approximately 300 kHz and a second frequency of approximately 500 kHz.

As shown in FIG. 1, the housing 120 may be configured with a tether location 190 that is configured for the tethering of a line or cable (such as a fishing line) thereto. For example, the tether location 190 may include an eyelet, hook, clamp, or any other line tethering mechanism, such as those commonly employed in fishing lures and bobbers.

The sonar device 100 may be configured to collect one or more additional forms of information in addition to signals associated with ultrasound detection. One of ordinary skill in the art would appreciate that components of the system could be configured to collect a variety of different information, and embodiments of the present invention are contemplated, and may be adapted, for use with a variety of additional forms of collectable information. For example, the sonar device 100 may further include one or more additional sensors for collecting additional signals and/or sensor data. For example, one or more additional sensors may be selected from the non-limiting list including a thermometer, a speed sensor, an accelerometer, and a Global Positioning System device. One of ordinary skill in the art would appreciate that there are numerous types of sensors that could be utilized with embodiments of the present disclosure. The sonar device 100 may further include additional components, not shown in FIG. 1, including, but not limited to, one or more of a data storage device, an indicator light, and an auditory signal generation device.

Sonar device 100 may also optionally include a GPS receiver for determining an absolute or relative location of the sonar device, and/or a speed or velocity of the sonar device. The GPS receiver can also employ other geopositioning mechanisms, including, but not limited to, triangulation, assisted OPS (AGPS), E-OTD, CI, SAI, ETA, BSS or the like, to further determine the physical location of the sonar device 100.

In the example system shown in FIG. 1, sonar device 200 is connected, or connectable, to a remote computing device 200. The sonar device 200 employs ultrasound transducers 110A-110C to acoustically interrogate a plurality of underwater spatial regions 114A-114C. Remote computing device 200 communicates with sonar device 100 in order to receive information collected by the sonar device, and to present information related to the detected underwater objects on a display.

It will be understood that remote computing device may be any device capable of processing the received signals and displaying, or interfacing with an external display, for the presentation of information to a user. Non-limiting examples of remote computing devices include smartphones, tablets, laptop computers, smartwatches, and other portable computing devices. Another example of a remote computing device is a computing system residing on, or integrated with, a vessel. The phrase "remote" refers to two devices that are physically separated and connect through a wired or wireless interface.

FIG. 1 illustrates an example embodiment of the computer hardware associated with remote computing device 200. Remote computing device 200 includes one or more processors 210 in communication with memory 220 via a bus 205. Remote computing device 200 includes a communication interfaces 230 for communicating with sonar device 100, a display 240, an optional internal or external storage media 250, and an optional input/output interfaces 260.

Remote computing device 200 also includes, or is connectable to, a power supply. A rechargeable or non-rechargeable battery may be used to provide power. The power may also be provided by an external power source, such as an AC adapter or a powered docking cradle that supplements and/or recharges a battery.

The processor 210 include may include an arithmetic logic unit, a microprocessor, a general purpose controller, or some other processor array to perform computations and/or provide electronic display signals to a display device. Processor 210 is shown coupled to the bus 205 for communication with the other components of the remote computing device 200. Although only a single processor 210 is shown in FIG. 1, multiple processors may be included and each processor may include a single processing core or multiple interconnected processing cores. Processor 210 may be capable of processing sonar data and rendering images displayable on a display device.

Memory 220 may include a RAM, a ROM, and other storage means. Memory 220 illustrates another example of computer storage media for storage of information such as computer readable instructions, data structures, program modules or other data. Memory 220 may store a basic input/output system ("BIOS") or firmware for controlling low-level operation of remote computing device 200. The memory 220 may also store an operating system 241 for controlling the operation of remote computing device 200. It will be appreciated that this component may include a general purpose operating system such as a version of Windows, Mac OS, UNIX, or LINUX™, or a specialized mobile client communication operating system such as iOS™, Android™, Windows Mobile™, or the Symbian® operating system, or an embedded operating system such as Windows CE. The operating system may include, or interface with a Java virtual machine module that enables control of hardware components and/or operating system operations via Java application programs.

Remote computing device may be configured to execute one or more applications or "apps". Such applications may include computer executable instructions stored by memory 220, and which, when executed by remote computing device 200, perform one or more algorithms disclosed herein for the generation and presentation of information on a user interface, where the information pertains to the detection of one or more underwater objects (optionally including the bed surface 102).

A communications interface 230 is provided for communication with one or more sonar devices 100, as described above in the context for communications interface 160. Communications interface 230 may include devices for communicating with other electronic devices.

Display 240 may be any suitable display device, such as a liquid crystal display (LCD), gas plasma, light emitting diode (LED), e-ink, or any other type of display used with a computing device. Display 240 may also include a touch sensitive screen arranged to receive input from an object such as a stylus or a digit from a human hand. In another example implementation, remote computing device 200 need not include a display, but may be connected or connectable to an external display device.

As shown in FIG. 1, remote computing device 200 may also include an internal or external storage medium 250, such as removable flash memory, a hard disk drive, or another external storage device. In one embodiment, a portion of the instructions executable by the processor 210 may also be located external to remote computing device 200.

Remote computing device 200 may also include input/output interfaces 260 for communicating with external devices, such as a headset, smartwatch or other input or output devices not shown in FIG. 1. Remote computing device 200 may also include a GPS receiver.

Remote computing device 200 may optionally communicate with a base station (not shown), or directly with another computing device. For example, a network interface device (not shown) may be included that provides circuitry for coupling remote computing device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols.

It is to be understood that the example system shown in FIG. 1 is not intended to be limited to the components that may be employed in a given implementation. Although only one of each component is illustrated in FIG. 1, any number of each component can be included. For example, the sonar device 100 and/or the remote computing device 200 may include one or more additional processors. In another example, a remote computing device may contain a number of different data storage media 250.

Although FIG. 1 illustrates an example embodiment that includes a single sonar device, it will be understood that in other example embodiments, a plurality of sonar devices may be connected to the remote computing device 200.

While some embodiments can be implemented in computer hardware, various embodiments are capable of being distributed as a computing product in a variety of forms and are capable of being applied regardless of the particular type of machine or computer readable media used to actually effect the distribution. At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, nonvolatile memory, cache or a remote storage device.

A computer readable storage medium can be used to store software and data which when executed by a data processing system causes the system to perform various methods. The executable software and data may be stored in various places including for example ROM, volatile RAM, nonvolatile memory and/or cache. Portions of this software and/or data may be stored in any one of these storage devices. As used herein, the phrases "computer readable material" and "computer readable storage medium" refers to all computer-readable media, except for a transitory propagating signal per se.

Referring again to FIG. 1, the sonar device 100 illustrates a non-limiting example transducer configuration involving three ultrasound transducers 110A-110C, where each transducer is oriented with its ultrasound beam axis directed in a unique direction, for the interrogation of different spatial regions. The example configuration shown in FIG. 1 illustrates an embodiment in which the angled ultrasound transducers 110A and 110B form a pair of angled ultrasound transducers located on opposite sides of the primary axis 105. The pair of angled ultrasound transducers 110A and 110B are thus configured to interrogate respective lateral regions 114A and 114B on either side of the device.

In various embodiments, the sonar device includes a plurality of angled ultrasound transducers, such as angled ultrasound transducers 110A and 110B, and may optionally include a central ultrasound transducer, such as central ultrasound transducer 110C. As shown in FIG. 1, the angled ultrasound transducers and oriented such that their respective ultrasound beam axes are directed outwardly at an acute angle relative to the primary axis 105.

Although the angular bandwidth of the angled transducers 110A and 110B are shown in FIG. 1 as non-overlapping, it will be understood that one or more of the frequencies of the angled ultrasound transducers, and their respective angles relative to the primary axis 105, may be varied in order to achieve spatial overlap. In one non-limiting example implementation, the acute angles of the angled transducers, relative to the primary axis 105, may be selected to lie between 20° and 30°.

As noted above, the sonar device 100 may optionally include a central transducer 110C that is oriented such that its ultrasound beam axis 112C is parallel to, or directed along, the primary axis 105. As described below, the central ultrasound transducer 110C may be employed to detect the presence of underwater objects directly underneath the sonar device, in addition to the detection in the lateral spatial regions associated with the angled ultrasound transducers. The central ultrasound transducer 110C may also optionally be employed to provide a bed depth measure associated with the depth of the bed surface 102. The central ultrasound transducer may be provided between, or may be surrounded by, the angled transducers. Alternatively, the central ultrasound transducer may be located adjacent to the angled transducers.

Figure 2A:
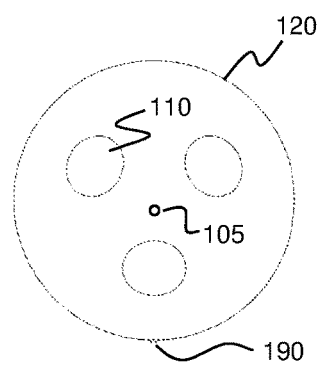
FIGS. 2A-F shows various example transducer configurations of a sonar device.
Figure 2B:
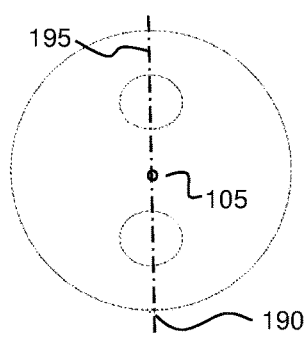
Figure 2C:
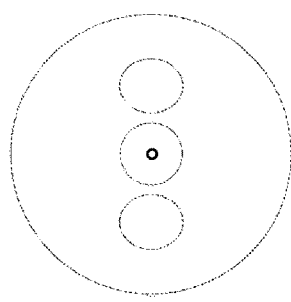
Figure 2D:
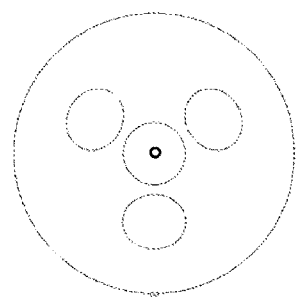
Figure 2E:
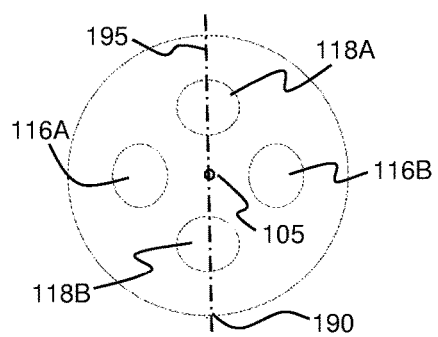
Figure 2F:
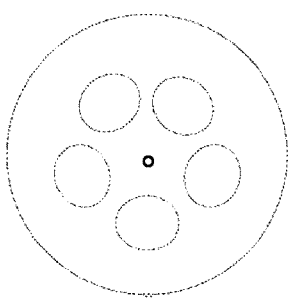

FIGS. 2A-2F illustrate a number of example configurations of the angled transducers, where the housing 120 is shown from below, viewed along the primary axis. FIG. 2A shows an example configuration in which a triangular array of transducers 110 are provided. FIG. 2B shows another example configuration involving a pair of adjacent angled transducers, located on opposing sides of the primary axis. FIG. 2C shows the angled-transducer pair of FIG. 2B with an additional central transducer centered therebetween. FIG. 2D shows the triangular array of angled transducers of FIG. 2A, with an additional central transducer centered therebetween. FIG. 2E shows an example configuration involving a square array of angled transducers, where each angled transducer is angled to interrogated a separate spatial quadrant. FIG. 2F shows yet another example configuration whereby a pentagonal array of transducers is provided.

As shown in FIGS. 2A-2F, the arrays of angled transducers may be centered on the primary axis. Also, as shown in the figures, the angled transducers may be evenly spaced around the primary axis. In other example embodiments, the transducers may be unevenly spaced, for example, in the form of a rectangular array, as opposed to the square array of FIG. 2E.

FIGS. 2A-2E show the presence of the tether location 190. Referring now to FIG. 2E, by way of example, the tether location 190 and the primary axis 105 define a longitudinal plane 195, indicative a towing direction of the sonar device when the sonar device is towed by a tether attached to tether location 190. As shown in FIG. 2E, a first pair of angled transducers 116A and 116B may be located on opposing sides of the longitudinal plane 195, such that the first pair of transducers 116A and 116B scans the lateral directions (left and right; port and starboard) as the sonar device is towed. A second pair of angled transducers 118A and 118B may be provided such that their respective ultrasound beam axes are directed within the longitudinal plane (or approximately within the plane, for example within ±1°, ±2°, or ±5°), such that the second pair of angled transducers 118A and 118B are configured to scan the longitudinal directions (forward and reverse; bow and stern) when the sonar device is towed.

As shown in various embodiments illustrated in FIGS. 2A-2F, the angled ultrasound transducers may be provided as discrete circumferential array. The circumferential array may be located such that it surrounds, and is optionally centered on, the primary axis (and/or a central ultrasound transducer). In some non-limiting example embodiments, the angled ultrasound transducers of the circumferential array may include 3, 4, 5, 6, 7, 8, 9 or 10 evenly spaced transducers. In one example implementation, the array of angled ultrasound transducers may be symmetrically arranged relative to the longitudinal plane 190 within a suitable spatial tolerance (e.g. within ±100 μm, ±200 μm, ±500 μm, ±1 mm, ±2 mm or ±5 mm). In one example implementation, the array of angled transducers may be spatially arranged such that their net center of mass is located on or near (e.g. within ±100 μm, ±200 μm, ±500 μm, ±1 mm, ±2 mm or ±5 mm) the primary axis.

Figure 3A:
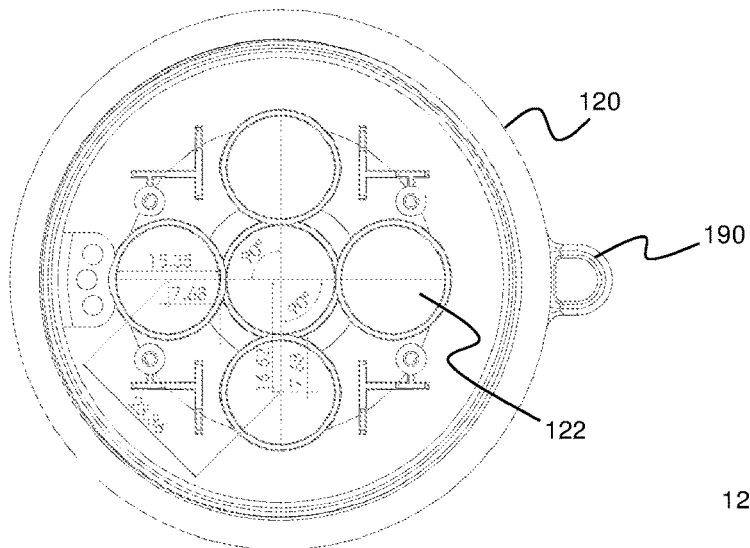
FIGS. 3A-F show several views of the bottom portion of a housing of an example sonar device.
Figure 3B:
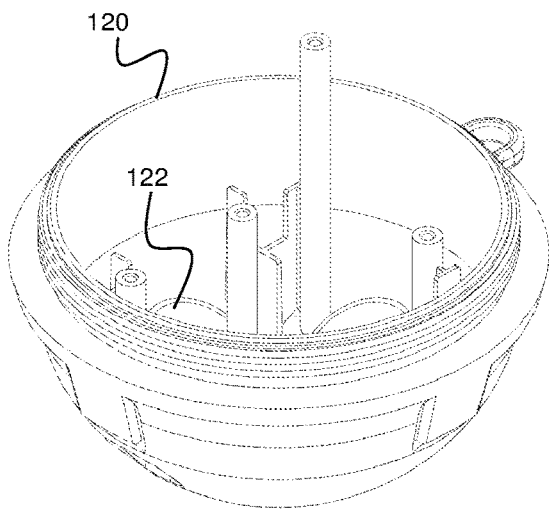
Figure 3C:
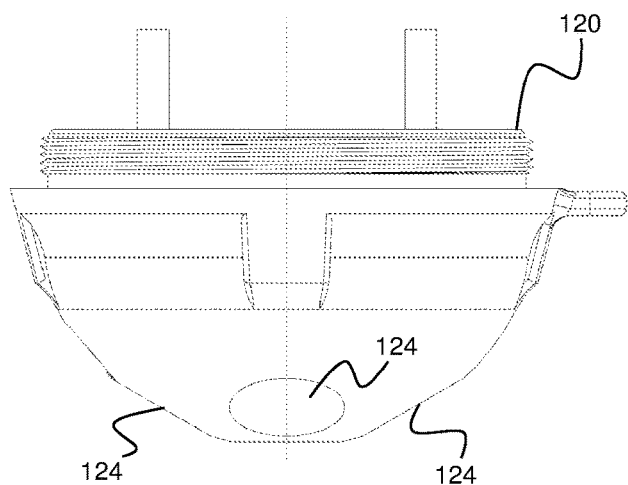
Figure 3D:
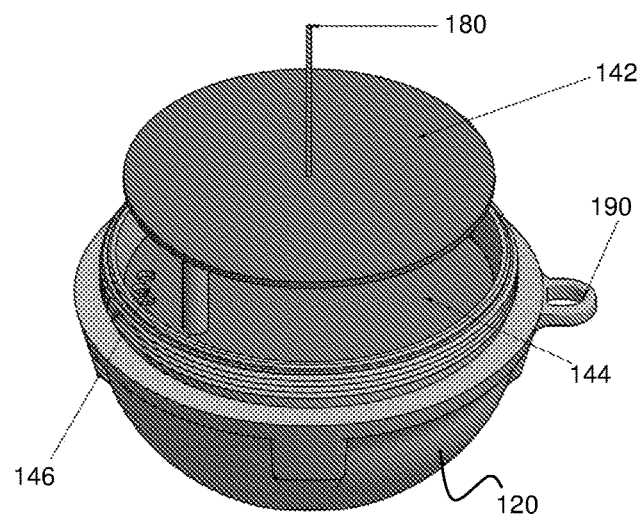
Figure 3E:
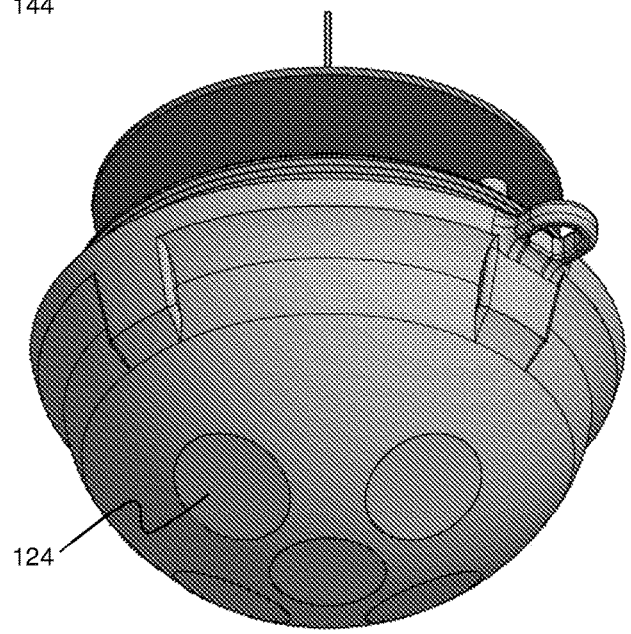
Figure 3F:
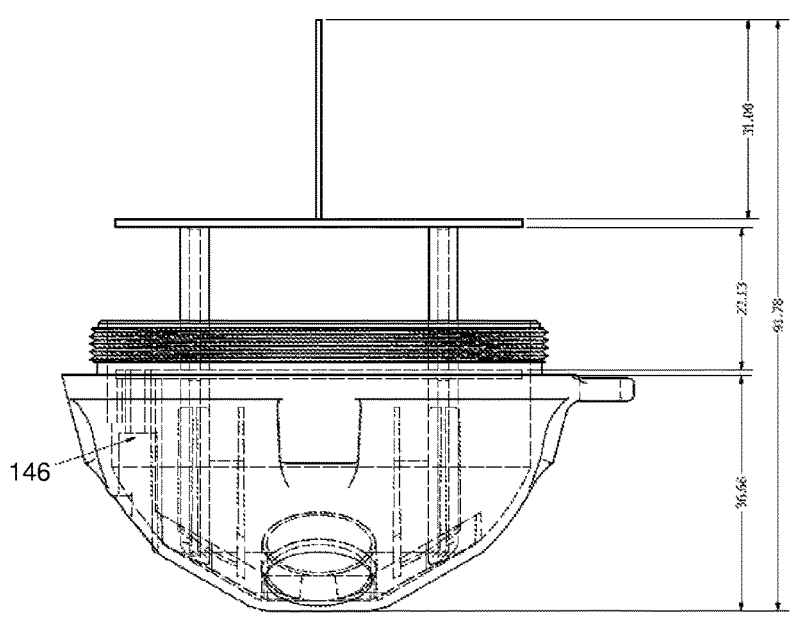

Referring now to FIGS. 3A-3F, an example implementation of the bottom portion of an example housing 120 of a sonar device is shown. Example housing 120 includes receptacles 122 for housing a set of four angled ultrasound transducers and a central ultrasound transducer. Housing 120 also includes an external tether location 190. In FIG. 3C, external planar surfaces 124, thought which ultrasound energy is to be emitted and collected by the ultrasound transducers, are shown in the lower portion of the external surface of the example housing 120. FIGS. 3D-3F show additional views of the housing 120, where two electronics platforms 142 and 144 are shown, with antenna 180 provided in an upper portion of the housing, above the water line when the sonar device is floated in water. Lower platform 144 includes through-holes for connecting the electronics (not shown) to the ultrasound transducers.

The preceding example embodiments have disclosed sonar devices, and associated systems, where the sonar device includes a plurality of angled transducers, and optionally a central transducer, where the ultrasound transducers are configured to interrogate different underwater spatial regions.

Figure 4:
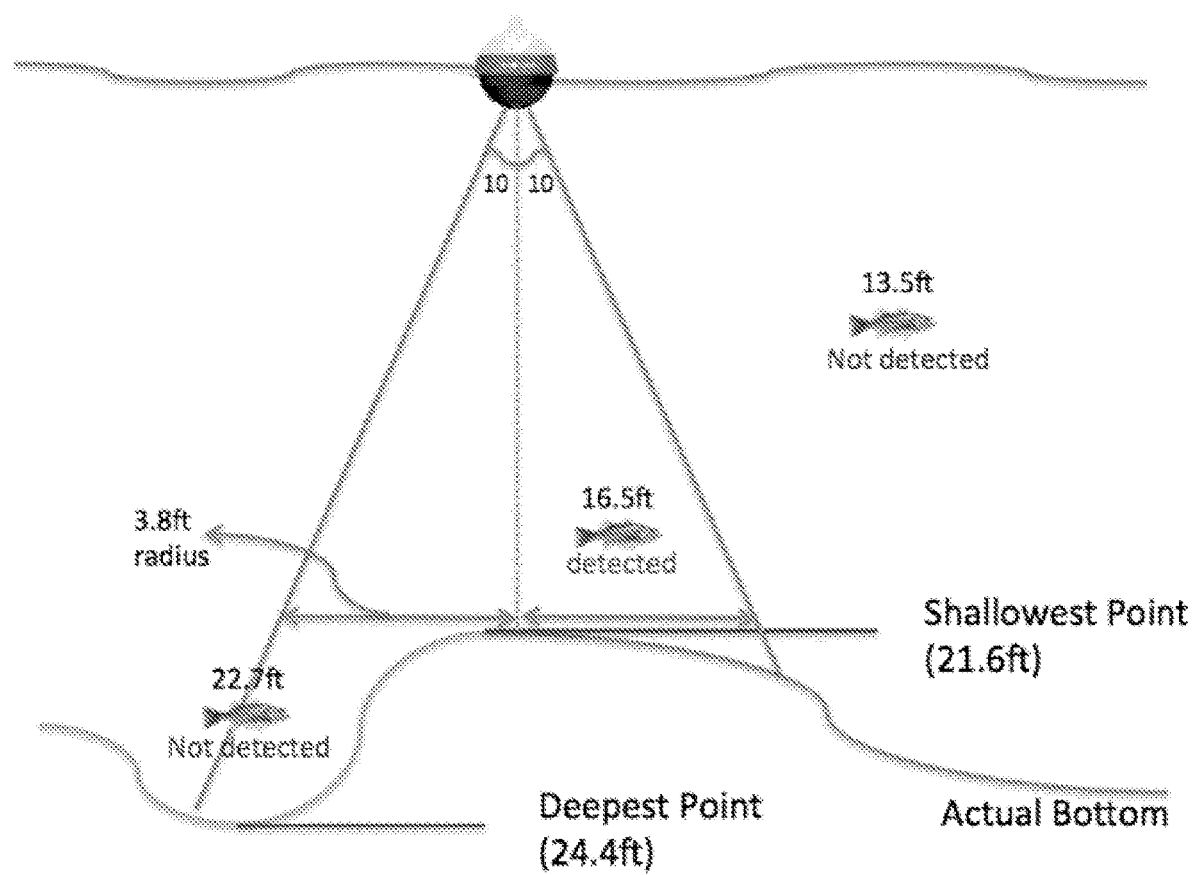
FIG. 4 illustrates an example of configuration of an ultrasound beam employed for detection of underwater objects.

Referring now to FIG. 4, an example method of detection of underwater objects, using a multi-transducer sonar device, is described. In the example configuration illustrated in FIG. 4, the example sonar device includes two angled ultrasound transducers (left and right) and a central transducer. The central transducer is directed in a downward direction, while the left and right transducers are at a 30 degree angle from the primary axis. In the present non-limiting example, each transducer is a dual-frequency transducer exhibiting a 12-20° beam angle (12° for high frequency operation and 20° for low frequency operation). Each transducer generates a receive signal integrating the response over its entire coverage area. A conventional pulse-echo depth sounding method may then be employed, using the shallowest point as the depth, and then detecting the relative depth of any underwater objects (e.g. fish) within this depth range.

FIG. 4 shows the ultrasound beam emitted by the central transducer (the lateral beams from the angled transducer pair are not shown), showing the beam angle associated with the 20° coverage area when sounded with low frequency central beam.

As can be seen from the figure, the shallowest detected point in the actual bottom contour is 21.6 ft, while the deepest detected point is 24.4 ft. Because the transducer integrates over its entire coverage area, the calculated depth measure will be 21.6 ft, the shallowest point it detects. Once the depth has been determined, the underwater object detection algorithm searches for underwater objects up to the processed depth, in this case, searching for underwater objects within its detection area that is shallower than the processed depth. In the above graphic, there is only one fish within the detection area at a depth less than 21.6 ft, being the fish at 16.5 ft. The fish at 13.5 ft is outside of the ultrasound beams coverage area and will not be detected. The fish at 22.7 ft is deeper than the processed depth of 21.6 ft and thus, will not be detected.

The same method may then be applied to the signals received from the lateral pair of angled transducers in order to search for, and optionally determine the depth of, underwater objects within the lateral spatial regions associated with the angled transducers. The left and right transducers may operate under the same constraints as the central transducer, but are adjusted for their angle relative to the primary axis. Both angled transducers process depth as the shallowest point within their respective coverage areas and find fish up to their processed depths, as in the method described above.

The aforementioned example method thus provides information pertaining to the presence, and optional depth, of underwater objects in a plurality of spatial regions, with each spatial region associated with a different ultrasound transducer. This spatial information may be employed to provide a user with a visualization of the spatial locations of one or more detected underwater objects.

Figure 5:
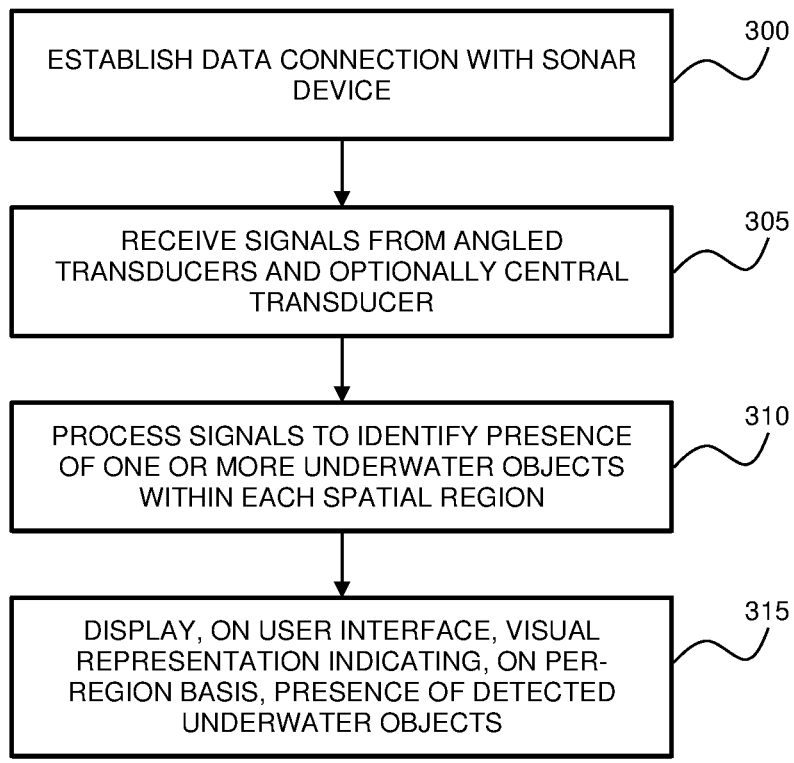
FIG. 5 is a flow chart describing an example method of visualizing the spatial locations of underwater objects identified by a plurality of ultrasound transducers, the transducers being configured to detect underwater objects in different spatial directions.

FIG. 5 provides a flow chart illustrating an example embodiment of processing the data to obtain spatial information associated with the detection of underwater objects, and presenting this information to a user on a user interface associated with the remote computing device. In optional step 300, a data connection is established with the sonar device (alternatively, a data connection need not be established if the sonar device is broadcasting data according to a wireless protocol that does not require a connection). The signals from the angled transducers, and optionally from a central transducer (if present), and then received in step 305. These signals are processed, in step 310, in order to identify the presence of, and optionally the depth of, underwater objects within the spatial region (e.g. field of view) associated with each transducer (for example, using the example methods described above). In step 315, the presence, and optional depth measure, associated with each detected underwater object, is displayed on a user interface associated with the remote computing device (e.g. displayed on a display integrated with, or connected to, the remote computing device), where a visual representation of the spatial regions is provided, indicating the presence and optional depth of the detected underwater objects on a per-region basis.

In one example embodiment, the spatial regions are shown, on the user interface, in a manner that represents their relative location. For example, if a sonar device is employed having four angled transducers, with four quadrants associated therewith, a graphical display may show four regions positioned according to the relative positions of the four quadrants, with each region showing information associated with the presence of underwater objects detected therein. In other words, the geometrical arrangement of the regions shown in the visualization on the user interface may correlate with the geometrical arrangement of the transducers of the sonar device. In embodiments in which a central transducer is employed along with angled transducers, the visualization may show a central region associated with the central transducer, surrounded by regions associated with the angled transducers.

The user interface may also be configured to display depth information associated with one or more of the transducers. For example, in one example embodiment, depth information may be provided based on a bed depth measure obtained from the central transducer. In another example embodiment, depth information associated with any transducer may be selectively displayed based on input from a user.

Figure 6A:
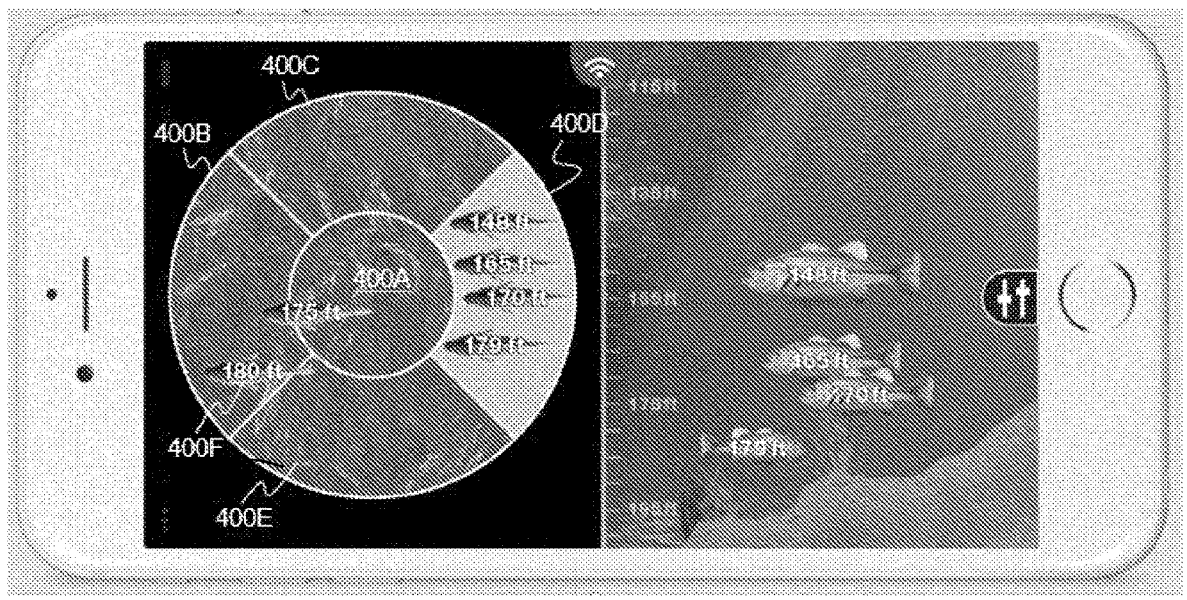
FIGS. 6A and 6B show example user interface screenshots illustrating spatial-resolved detection and identification of underwater objects.
Figure 6B:
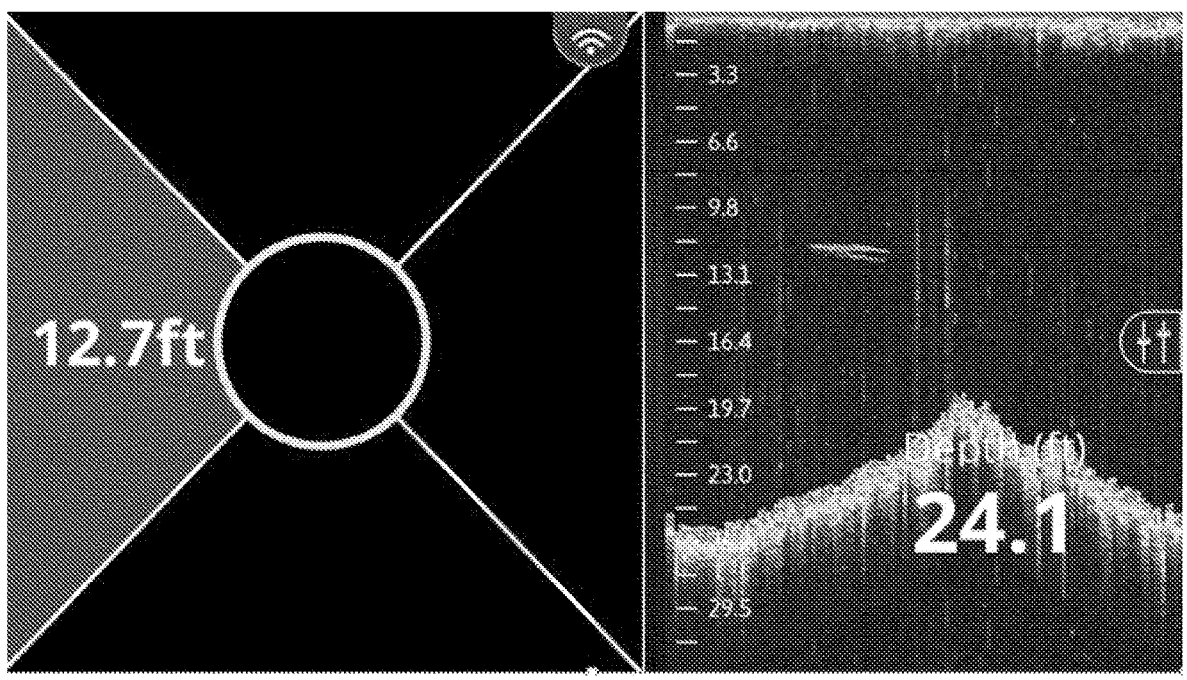

FIGS. 6A and 6B show two example implementations of a visualization according to the method described in FIG. 5. In FIG. 6A, a smartphone is shown displaying a visualization showing five quadrants 400A, 400B, 400C, 400D and 400E associated with geometrical arrangement of five transducers arranged according to the configuration shown in FIGS. 3A-F. Fish identified based on the signals obtained from the various transducers of the sonar device are shown in their associated regions, along with depth information. The right image shows a depth-based view of the highlighted quadrant, with a visualization of the different fish depths.

FIG. 6B illustrates an example implementation in the visualization is configured such that if one or more transducers locates an underwater object (e.g. a fish), the respective quadrant(s) and/or center region is identified (e.g. lit up or coloured), also indicating the detected depth(s). In the screenshot shown in FIG. 6B, the processed depth is 23.3 ft and the sonar device detected a fish to its left at 12.7 ft.

It is noted that in some embodiments, the sonar data received by the remote computing device is raw sonar data, and thus step 310 is performed remotely relative to the sonar device, by the remote computing device. Alternatively, the processing circuitry of the sonar device may be configured to identify the underwater objects within each spatial region, and optionally calculate a depth measured associated with each underwater object, and this information may be provided to the remote computing device as pre-processed sonar data.

Figure 7:
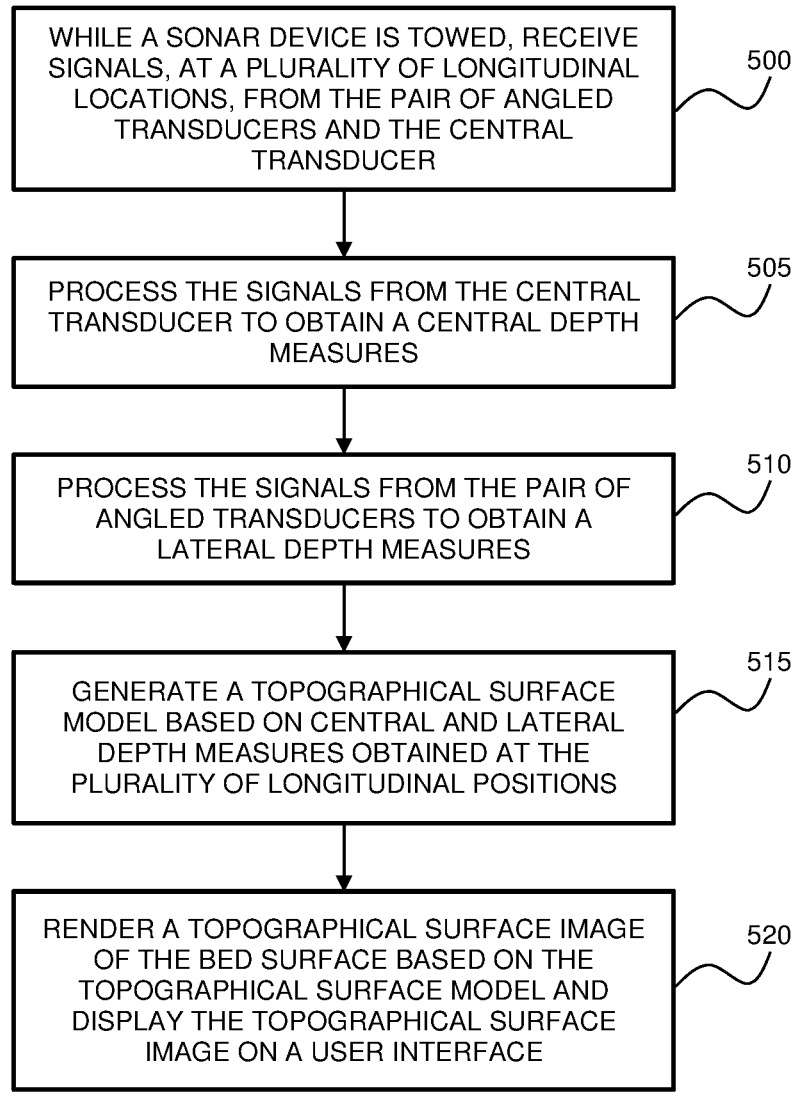
FIG. 7 is a flow chart illustrating an example method for rendering a topographical surface image of a bed surface on a user interface.

FIG. 7 shows a flow chart illustrating a method of generating and rendering a three-dimensional view of a bed surface (the floor or bottom surface of a body of water) based on ultrasound signals collected from a sonar device employing a pair of angled transducers and a central transducer, where the angled transducers are positioned and directed to interrogate lateral regions (left and right; port and starboard) when the sonar device is towed.

As shown in step 500, ultrasound signals are obtained from pair of angled transducers and the central transducer over a plurality of longitudinal locations as the sonar device is towed. In step 505, the signals from the central transducer are processed to generate a plurality of central depth measures corresponding to the different longitudinal locations. Similarly, in step 510, the signals from the angled transducers are processed to generate a plurality of lateral depth measures corresponding to the different longitudinal locations.

These central and lateral depth measures form a grid of discrete estimated depth measures (based on an assumption that the sonar device is towed in a straight line), where the grid has three values in the lateral direction (two lateral measures from the angled transducers, and one central measure from the central transducer, and a plurality of values in the longitudinal direction. This grid is then processed, in step 515, and a fitting algorithm (e.g. at least-squares based polynomial algorithm) is employed to generate a three-dimensional topographical surface model. It will be understand that any known surface fitting model may be employed to produce the topographical model, such as those employed in the cartography arts.

In step 520, the topographical surface model is processed to render a topographical surface image that is displayable on a user interface, such that the image shows the three-dimensional features (contours) of the surface. Any suitable rendering method may be employed, such as those known in the computer graphics arts (e.g. perspective-based rendering methods). It will be understood that even though the actual surface will have more undulations than those that are rendered, the simplified rendering will provide the user with useful and simplified structural information, which may be employed to gauge the suitability of a location for fishing.

Figure 8:
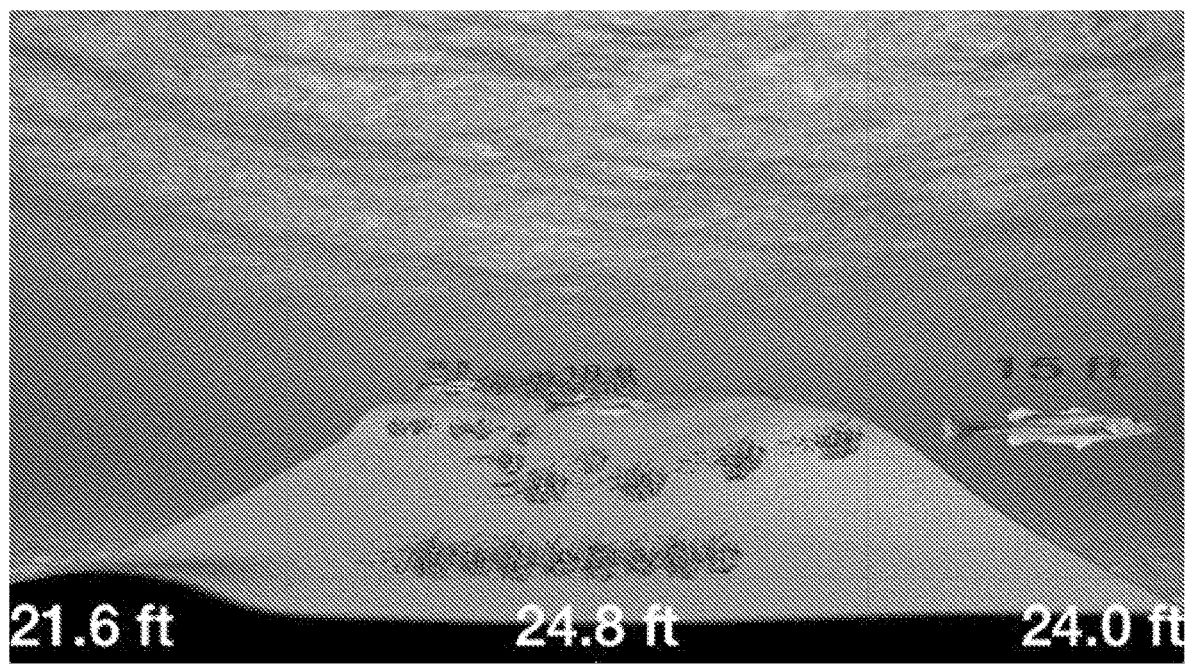
FIG. 8 is a screenshot of an example rendering of a topographical image of a bed surface.

In one example implementation, the topographical surface image is rendered based on a viewpoint located between the bed surface and the water surface. This rendering may be animated to provide a fly-over view of the surface. FIG. 8 shows an example of such a rendering.

In some embodiments, the topographical surface image is rendered in real-time (or near real-time, delayed by processing and communication time delays).

The longitudinal direction of the generated image may be based on inferred longitudinal position (e.g. based on a GPS device associated with the sonar device or remote computing device), or scaled based on associated time stamp values.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A sonar device, the sonar device comprising:
   a housing configured to float on a surface of a body of water, wherein the housing defines a primary axis;
   a power source positioned within the housing;
   an array of transducers positioned within the housing;
   a wireless communication element configured to transmit one or more signals to and receive one or more signals from a remote computing device; and
   processing circuitry provided within the housing, wherein the processing circuitry is configured to:
      receive one or more sonar return signals from the array of transducers;
      process the one or more sonar return signals to generate sonar return data corresponding to a plurality of regions, wherein the plurality of regions each corresponds to different volumes of the body of water with respect to the primary axis of the housing;
      generate a plurality of sonar images, wherein each of the plurality of sonar images corresponds to each of the plurality of regions, wherein the sonar image for each of the plurality of regions is formed from sonar return data for the corresponding one of the plurality of regions; and
      transmit, via the wireless communication element, the plurality of sonar images to the remote computing device for presentation on a display of the remote computing device such that the plurality of sonar images are presented on the display within a visual representation of the sonar device in positions with respect to each other that correspond to the different volumes of the body of water with respect to the primary axis of the housing, wherein the visual representation of the sonar device is presented on the display along with the plurality of sonar images.

2. The sonar device of claim 1, wherein the array of transducers comprises at least a first transducer and a second transducer, wherein the first transducer is positioned within the housing to generate first sonar return data corresponding to a first region, wherein the second transducer is positioned within the housing to generate second sonar return data corresponding to a second region, wherein the first region is generally symmetrically opposite the second region with respect to a vertical plane including the primary axis.

3. The sonar device of claim 2, wherein the processing circuitry is further configured to transmit the plurality of sonar images to the remote computing device for presentation on the display of the remote computing device such that a first sonar image corresponding to the first sonar return data is presented in a first position on the display and a second sonar image corresponding to the second sonar return data is presented in a second position on the display, and such that the first position and the second position are within the visual representation of the sonar device on the display.

4. The sonar device of claim 3, wherein the processing circuitry is further configured to transmit the plurality of sonar images to the remote computing device for presentation on the display of the remote computing device such that the first position is generally symmetrically opposite the second position with respect to a center of the visual representation of sonar device on the display.

5. The sonar device of claim 1, wherein the processing circuitry is further configured to:
   determine, based on the one or more sonar return signals, an instance in which an object has entered one of the plurality of regions; and
   transmit an instruction signal to the remote computing device indicating the one of the plurality of regions for which the object entered.

6. The sonar device of claim 5, wherein the instruction signal causes the remote computing device to highlight a sonar image associated with the one of the plurality of regions for which the object entered.

7. The sonar device of claim 5, wherein the instruction signal causes the remote computing device to present the sonar image associated with the one of the plurality of regions for which the object entered.

8. The sonar device of claim 7, wherein the processing circuitry is further configured to:
   determine a depth associated with the object; and
   wherein the instruction signal further causes the remote computing device to present the depth associated with the object.

9. A system comprising:
   a sonar device comprising:
      a housing configured to float on a surface of a body of water, wherein the housing defines a primary axis;
      a power source positioned within the housing;
      an array of transducers positioned within the housing;
      a wireless communication element configured to transmit one or more signals to and receive one or more signals from a remote computing device; and processing circuitry provided within the housing, wherein the processing circuitry is configured to:
receive one or more sonar return signals from the array of transducers;
process the one or more sonar return signals to generate sonar return data corresponding to a plurality of regions, wherein the plurality of regions each corresponds to different volumes of the body of water with respect to the primary axis of the housing;
generate a plurality of sonar images, wherein each of the plurality of sonar images corresponds to each of the plurality of regions, wherein the sonar image for each of the plurality of regions is formed from sonar return data for the corresponding one of the plurality of regions; and
transmit, via the wireless communication element, the plurality of sonar images to the remote computing device for presentation on a display of the remote computing device such that the plurality of sonar images are presented on the display within a visual representation of the sonar device in positions with respect to each other that correspond to the different volumes of the body of water with respect to the primary axis of the housing; and
the remote computing device comprising:
a user interface comprising a display, wherein the display is configured to present the plurality of sonar images such that the plurality of sonar images are presented on the display within the visual representation of the sonar device in positions with respect to each other that correspond to the different volumes of the body of water with respect to the primary axis of the housing, wherein the visual representation of the sonar device is presented on the display along with the plurality of sonar images.

10. The system of claim 9, wherein the array of transducers comprises at least a first transducer and a second transducer, wherein the first transducer is positioned within the housing to generate first sonar return data corresponding to a first region, wherein the second transducer is positioned within the housing to generate second sonar return data corresponding to a second region, wherein the first region is generally symmetrically opposite the second region with respect to a vertical plane including the primary axis.

11. The system of claim 10, wherein the processing circuitry is further configured to transmit the plurality of sonar images to the remote computing device for presentation on the display of the remote computing device such that a first sonar image corresponding to the first sonar return data is presented in a first position on the display and a second sonar image corresponding to the second sonar return data is presented in a second position on the display, and such that the first position and the second position are within the visual representation of the sonar device on the display, and
wherein the display of the remote computing device is configured to present the plurality of sonar images such that the first sonar image corresponding to the first sonar return data is presented in the first position on the display and the second sonar image corresponding to the second sonar return data is presented in the second position on the display, and such that the first position and the second position are within the visual representation of the sonar device on the display.

12. The system of claim 11, wherein the processing circuitry is further configured to transmit the plurality of sonar images to the remote computing device for presentation on the display of the remote computing device such that the first position is generally symmetrically opposite the second position with respect to a center of the visual representation of sonar device on the display, and
wherein the display of the remote computing device is configured to present the plurality of sonar images such that the first position is generally symmetrically opposite the second position with respect to the center of the visual representation of sonar device on the display.

13. The system of claim 9, wherein the processing circuitry is further configured to:
determine, based on the one or more sonar return signals, an instance in which an object has entered one of the plurality of regions; and
transmit an instruction signal to the remote computing device indicating the one of the plurality of regions for which the object entered.

14. The system of claim 13, wherein the instruction signal causes the remote computing device to present the sonar image associated with the one of the plurality of regions for which the object entered, and
wherein the display is configured present the sonar image associated with the one of the plurality of regions for which the object entered.

15. The system of claim 14, wherein the display is configured present the sonar image associated with the one of the plurality of regions for which the object entered in a side-by-side relationship with a visual representation of the sonar device that includes the plurality of sonar images.

16. The system of claim 14, wherein the processing circuitry is further configured to:
determine a depth associated with the object; and
wherein the instruction signal further causes the remote computing device to present the depth associated with the object; and
wherein the display is configured to present the depth associated with the object.

17. The system of claim 9, wherein the user interface is configured to receive user input selecting at least one of the plurality of sonar images, and wherein the display is configured to, in response to receiving the user input, present the sonar image associated with the selected one of the plurality of sonar images in a side-by-side relationship with the visual representation of the sonar device that includes the plurality of sonar images.

18. The system of claim 17, wherein the presented sonar image is a depth-based view of the corresponding one of the plurality of regions of the body of water.

19. A method comprising:
receiving one or more sonar return signals from an array of transducers within a housing of a sonar device, wherein the housing is configured to float on a surface of a body of water, wherein the housing defines a primary axis, wherein the sonar device further includes:
a power source positioned within the housing;
a wireless communication element configured to transmit one or more signals to and receive one or more signals from a remote computing device; and
processing circuitry provided within the housing;
processing, via the processing circuitry, the one or more sonar return signals to generate sonar return data corresponding to a plurality of regions, wherein the plurality of regions each corresponds to different volumes of the body of water with respect to the primary axis of the housing;

generating a plurality of sonar images, wherein each of the plurality of sonar images corresponds to each of the plurality of regions, wherein the sonar image for each of the plurality of regions is formed from sonar return data for the corresponding one of the plurality of regions; and transmitting, via the wireless communication element, the plurality of sonar images to the remote computing device for presentation on a display of the remote computing device such that the plurality of sonar images are presented on the display within a visual representation of the sonar device in positions with respect to each other that correspond to the different volumes of the body of water with respect to the primary axis of the housing, wherein the visual representation of the sonar device is presented on the display along with the plurality of sonar images.

* * * * *